(12) United States Patent
Osmundson (10) Patent No.: US 11,938,449 B2
(45) Date of Patent: Mar. 26, 2024

(54) CERAMIC MEMBRANE FILTRATION ASSEMBLY WITH MULTI PORT ENDCAP AND RELATED METHODS

(71) Applicant: Nanostone Water Inc., Waltham, MA (US)

(72) Inventor: Paul Osmundson, Eden Prairie, MN (US)

(73) Assignee: Nanostone Water Inc., Waltham, MA (US)

( * ) Notice: Subject to any disclaimer, the term of this patent is extended or adjusted under 35 U.S.C. 154(b) by 766 days.

(21) Appl. No.: 16/302,455

(22) PCT Filed: Jul. 21, 2017

(86) PCT No.: PCT/US2017/043385
§ 371 (c)(1),
(2) Date: Nov. 16, 2018

(87) PCT Pub. No.: WO2018/018012
PCT Pub. Date: Jan. 25, 2018

(65) Prior Publication Data
US 2019/0291055 A1 Sep. 26, 2019

Related U.S. Application Data

(60) Provisional application No. 62/365,220, filed on Jul. 21, 2016.

(51) Int. Cl.
*B01D 63/00* (2006.01)
*B01D 61/18* (2006.01)
(Continued)

(52) U.S. Cl.
CPC .......... *B01D 63/066* (2013.01); *B01D 63/06* (2013.01); *B01D 71/05* (2022.08); *B01D 61/18* (2013.01);
(Continued)

(58) Field of Classification Search
CPC ...... B01D 63/066; B01D 63/06; B01D 71/02; B01D 2313/125; B01D 2313/08;
(Continued)

(56) References Cited

U.S. PATENT DOCUMENTS 4,080,296 A * 3/1978 Clark ................... B01D 63/024
 210/321.87
5,470,469 A * 11/1995 Eckman ................. B01D 63/02
 210/321.8

(Continued)

FOREIGN PATENT DOCUMENTS

JP 2006247438 9/2006
WO WO2016/112122 7/2016
(Continued)

OTHER PUBLICATIONS

International Search Report and Written Opinion in correspondence Application No. PCT/US2017/043385, dated Nov. 2, 2017, pp. 1-13.

*Primary Examiner* — Magali P Slawski
*Assistant Examiner* — Robin S Gray
(74) *Attorney, Agent, or Firm* — Fish & Richardson P.C.

(57) ABSTRACT

A ceramic membrane filtration assembly includes a housing and a membrane assembly. The membrane assembly includes at least one membrane with channels therein. A first inner end cap device is disposed within the housing and is coupled with the membrane assembly. The housing has a bypass near an outer perimeter of the first inner end cap device, the first inner end cap device has an inner port, the inner port fluidly coupled with the channels of the membrane, where the bypass includes a space between the housing and the first inner end cap device. A first outer end cap device is coupled with the first inner end cap device; the first outer end cap device has a first port and a second port, (Continued)

where the first port is fluidly separate from the second port, and the first port is fluidly coupled with the inner port.

16 Claims, 6 Drawing Sheets

(51) Int. Cl.
*B01D 63/06* (2006.01)
*B01D 71/00* (2006.01)
*B01D 71/02* (2006.01)

(52) U.S. Cl.
CPC .... *B01D 2313/025* (2013.01); *B01D 2313/04* (2013.01); *B01D 2313/08* (2013.01); *B01D 2313/083* (2013.01); *B01D 2313/10* (2013.01); *B01D 2313/125* (2013.01); *B01D 2313/201* (2022.08); *B01D 2313/21* (2013.01); *B01D 2313/44* (2013.01); *B01D 2315/10* (2013.01); *B01D 2321/04* (2013.01)

(58) Field of Classification Search
CPC .............. B01D 61/18; B01D 2313/025; B01D 2313/04; B01D 2313/083; B01D 2313/20; B01D 2313/21; B01D 2313/44; B01D 2315/10; B01D 2321/04; B01D 29/092; B01D 2201/302; B01D 2201/291; B01D 2201/295

See application file for complete search history.

(56) References Cited

U.S. PATENT DOCUMENTS

| | | | |
|---|---|---|---|
| 6,755,894 B2* | 6/2004 | Bikson | B01D 53/22 |
| | | | 95/52 |
| 2006/0151375 A1* | 7/2006 | Marui | B01D 65/00 |
| | | | 210/321.89 |
| 2016/0317972 A1* | 11/2016 | Matsumoto | B01D 63/024 |
| 2018/0021732 A1* | 1/2018 | Osmundson | B01D 63/082 |
| | | | 210/321.6 |

FOREIGN PATENT DOCUMENTS

| | | | | |
|---|---|---|---|---|
| WO | WO-2016112122 A1 * | 7/2016 | .......... | B01D 63/082 |
| WO | WO2018/018012 | 1/2018 | | |

\* cited by examiner

CERAMIC MEMBRANE FILTRATION ASSEMBLY WITH MULTI PORT ENDCAP AND RELATED METHODS

CROSS REFERENCE TO RELATED APPLICATIONS

This application is a 371 U.S. National Phase application of PCT/US2017/043385, filed on Jul. 21, 2017, which claims priority to U.S. Provisional Application No. 62/365,220 that was filed on Jul. 21, 2016. The entire content of the applications referenced above are hereby incorporated by reference herein.

TECHNICAL FIELD

A ceramic membrane filtration assembly with a multi-port end cap and related methods.

TECHNICAL BACKGROUND

Many waters contain contaminants that can present a hazard to people or the environment, or make further processing, such as evaporation or reverse osmosis more difficult. Membranes are commonly used to remove such contaminants. Membrane elements are typically made of plastics, polymers or ceramics, both of which are frequently placed inside a pressure vessel to contain the pressurized fluid to be treated. The element and pressure vessel combination are referred to as membrane modules or modules. Such pressure vessels also provide separate ports to allow a feed to enter the module, filtrate to exit after being processed through the membrane, and a retentate for removal of the filtered material.

In many installations of membranes, a footprint of the installation needs to be minimized. Accordingly, there is a need for a filtration assembly with a minimized footprint.

SUMMARY

A ceramic membrane filtration assembly includes a housing having a first housing end and second housing end, where the housing has an outer circumference and an inner diameter. The filtration assembly further includes a membrane assembly extending from a first membrane assembly end to a second membrane assembly end. The membrane assembly includes at least one membrane, and one or more of the at least one membrane extends from a first membrane end to a second membrane end. One or more of the membranes having channels therein. The membrane assembly is disposed within the housing.

A first inner end cap device is disposed within the housing at the first housing end, the first inner end cap device coupled with the membrane assembly. The housing has a bypass near an outer perimeter of the first inner end cap device, the first inner end cap device having an inner port, the inner port fluidly coupled with the channels of the membrane, where the bypass includes a space between the housing and the first inner end cap device.

A first outer end cap device is disposed within the housing at the first housing end, where the first outer end cap device is fluidly coupled with the first inner end cap device. The first outer end cap device has a first port and a second port, where the first port is fluidly separate from the second port, and the first port is fluidly coupled with the inner port. The first outer end cap device is sealed with the housing.

In one or more embodiments, the first port is a dirty water port and the second port is a clean water port, and the dirty water port is fluidly separate from the clean water port.

In one or more embodiments, the first port is a clean water port and the second port is a dirty water port, and the dirty water port is fluidly separate from the clean water port.

In one or more embodiments, the first inner cap has a rounded, semi-spherical shape surrounding the inner port.

In one or more embodiments, the first port is offset from a longitudinal axis of the inner port.

In one or more embodiments, a cross-section of the first port and the second port are substantially a same size.

In one or more embodiments, a cross-sectional bypass area is substantially similar to a cross-sectional second port area.

In one or more embodiments, the inner diameter of the housing is recessed away from the first inner end cap device directly adjacent to the first inner end cap device.

In one or more embodiments, the second port is fluidly coupled with the bypass.

In one or more embodiments, the housing does not have a side port.

In one or more embodiments, a ceramic membrane filtration assembly comprises a housing having a first housing end and second housing end, where the housing has an outer circumference and an inner diameter. The filtration assembly further includes a membrane assembly extending from a first membrane assembly end to a second membrane assembly end, where the membrane assembly includes at least one membrane. One or more of the at least one membrane extends from a first membrane end to a second membrane end, and the membrane assembly is disposed within the housing. At least one membrane has channels therein.

In some embodiments, the disclosure provides a ceramic membrane filtration assembly, comprising: a housing having a first housing end and second housing end, the housing having an outer circumference, the housing having an inner diameter; a membrane assembly disposed within the housing and extending from a first membrane assembly end to a second membrane assembly end, the membrane assembly comprising a ceramic membrane extending from a first membrane end to a second membrane end and having channels therein, each channel comprising an interior and an exterior; a first inner end cap device disposed within the housing at the first housing end and coupled with the membrane assembly, the first inner end cap device comprising an inner port fluidly coupled with the interiors of the channels of the ceramic membrane; and a first outer end cap device sealed within the housing at the first housing end, the first outer end cap device fluidly coupled with the first inner end cap device, the first outer end cap device comprising first and second ports, and the first port being fluidly coupled with the inner port, wherein: a bypass is defined by a gap between the inner diameter of the housing and the first inner end cap device; and the ceramic membrane filtration assembly has a fluid path from the interiors of the channels of the ceramic membrane through the ceramic membrane to the exteriors of the channels of the ceramic membrane, and from the exteriors of the channels of the ceramic membrane past the bypass to the second port. In some embodiments, the ceramic membrane filtration assembly is configured so that, during use of the ceramic membrane filtration assembly, a liquid flows into the first port, from the first port to the inner port, from the inner port to the interiors of the channels of the ceramic membrane, from the interiors of the channels of the ceramic membrane through the ceramic membrane to the exteriors of the channels of the ceramic membrane, from the exteriors of the channels of the ceramic membrane to the bypass, and from the bypass to the second port.

In some embodiments, the disclosure provides a ceramic membrane filtration assembly comprising: a housing having a first housing end and second housing end, the housing having an outer circumference and an inner diameter; a membrane assembly disposed within the housing and extending from a first membrane assembly end to a second membrane assembly end, the membrane assembly comprising a ceramic membrane extending from a first membrane end to a second membrane end and having channels therein, each channel comprising an interior and an exterior; a first inner end cap device disposed within the housing at the first housing end, the first inner end cap device coupled with the membrane assembly, the first inner end cap device comprising an inner port fluidly coupled with the interiors of the channels of the ceramic membrane; a first outer end cap device sealed within the housing at the first housing end, the first outer end cap device coupled with the first inner end cap device, the first outer end cap device comprising a dirty water port and a clean water port, the dirty water port being fluidly coupled with the inner port; a second inner end cap device disposed within the housing at the second housing end, the second inner end cap device coupled with the membrane assembly; and a second outer end cap device sealed within the housing at the second housing end, the second outer end cap device comprising a second dirty water port fluidly coupled with the second inner end cap device, wherein: a bypass is defined by a gap between the inner diameter of the housing and the first inner end cap device; and the ceramic membrane filtration assembly has a fluid path from the interiors of the channels of the ceramic membrane through the ceramic membrane to the exteriors of the channels of the ceramic membrane, and from the exteriors of the channels of the ceramic membrane past the bypass to the clean water port. In some embodiments, the ceramic membrane filtration assembly is configured so that, during use of the ceramic membrane filtration assembly, a liquid flows into the dirty water port, from the dirty water port to the inner port, from the inner port to the interiors of the channels of the ceramic membrane, from the interiors of the channels of the ceramic membrane to the exteriors of the channels of the ceramic membrane, from the exteriors of the channels of the ceramic membrane to the bypass, and from the bypass to the clean water port.

A first inner end cap device is disposed within the housing at the first housing end, where the first inner end cap device is coupled with the membrane assembly. The housing has a bypass near an outer perimeter of the inner end cap device. The first inner end cap device having an inner port, where the inner port is fluidly coupled with the channels of the membrane.

A first outer end cap device is disposed within the housing at the first housing end, and the first outer end cap device coupled with the first inner end cap device. The first outer end cap device has a dirty water port and a clean water port, where the dirty water port is fluidly separate from the clean water port, and the dirty water port is fluidly coupled with the inner port. The first outer end cap device is sealed with the housing.

A second inner end cap device is disposed within the housing at the second housing end, where the second inner end cap device is coupled with the membrane assembly. A second outer end cap device is disposed within the housing at the second housing end. The second outer end cap device has a dirty port fluidly coupled with the second inner end cap device, and the second outer end cap device is sealed with the housing.

In one or more embodiments, the first inner end cap device and the second inner end cap device have a rounded, semi-spherical shape surrounding the inner port and the second inner port.

In one or more embodiments, the dirty water port is offset from a longitudinal axis of the inner port.

In one or more embodiments, the dirty water port and the clean water port have a substantially same cross-sectional size.

In one or more embodiments, a cross-sectional bypass area is substantially similar to a cross-sectional clean water port area.

In one or more embodiments, the inner diameter of the housing is recessed away from the first inner end cap device directly adjacent to the first inner end cap device.

In one or more embodiments, the clean water port is fluidly coupled with the bypass.

In one or more embodiments, the inner diameter of the housing is recessed away from the first inner end cap device for a length of the housing.

In one or more embodiments, the housing does not have a side port.

In one or more embodiments, a method of filtering water with a ceramic membrane filtration assembly as recited above includes supplying dirty water in the through the dirty water port of the first end cap device or a second dirty water port of the second end cap device, and releasing permeate though the clean water port of the first end cap device.

In one or more embodiments, the method further includes releasing contaminants through the dirty water port or the second dirty water port by supplying clean water to the clean water port to flow through the membrane assembly in a reverse direction.

These and other embodiments, aspects, advantages, and features of the present invention will be set forth in part in the description which follows, and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined;

other embodiments may be utilized or structural or logical changes may be made without departing from the scope of the invention. The following detailed description is, therefore, not to be taken in a limiting sense and the scope of the invention is defined by the appended claims and their legal equivalents.

In this document, the terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation.

A ceramic membrane filtration assembly 100 is shown in FIGS. 1-4D. The filtration assembly 100 can be used to treat fluids such as waste or water in a water treatment plant. The filtration assembly 100 can be loaded in a basin, used for membrane bioreactor, used for waste effluence, waste water treatment, or used in other applications. The assembly includes a ceramic membrane module that includes a membrane assembly such as a ceramic monolith or potted segments making up a monolith that is set back from the ends of the housing. In one or more embodiments, the segments and or monolith of the ceramic membranes are aligned and affixed in from the ends of the housing and are optionally potted in place in a manner that allow fluid to mix in a mixing zone and evenly distribute flow over the face end of the capillary of the ceramic monolith or potted monolith.

The ceramic membrane module is disposed within the housing 110. The housing 110 extends from a first housing end 112 to a second housing end 114, and is further defined by an inner diameter 116 and an outer surface 118 having an outer circumference. In one or more embodiments, the housing 110 includes a bypass 190, as further discussed below. In one or more embodiments, the housing does not have a side port.

In one or more embodiments the filtration assembly 100 includes at least one membrane assembly 120 disposed within the housing 110. The membrane assembly extends from a first membrane assembly end 122 to a second membrane assembly end 124, and includes at least one membrane 130. The at least one membrane 130 extends from a first membrane end to a second membrane end. One or more of the membranes includes channels therein which have channel ends 136. The channels receive the feed water therein further the filtration process.

Figure 1:
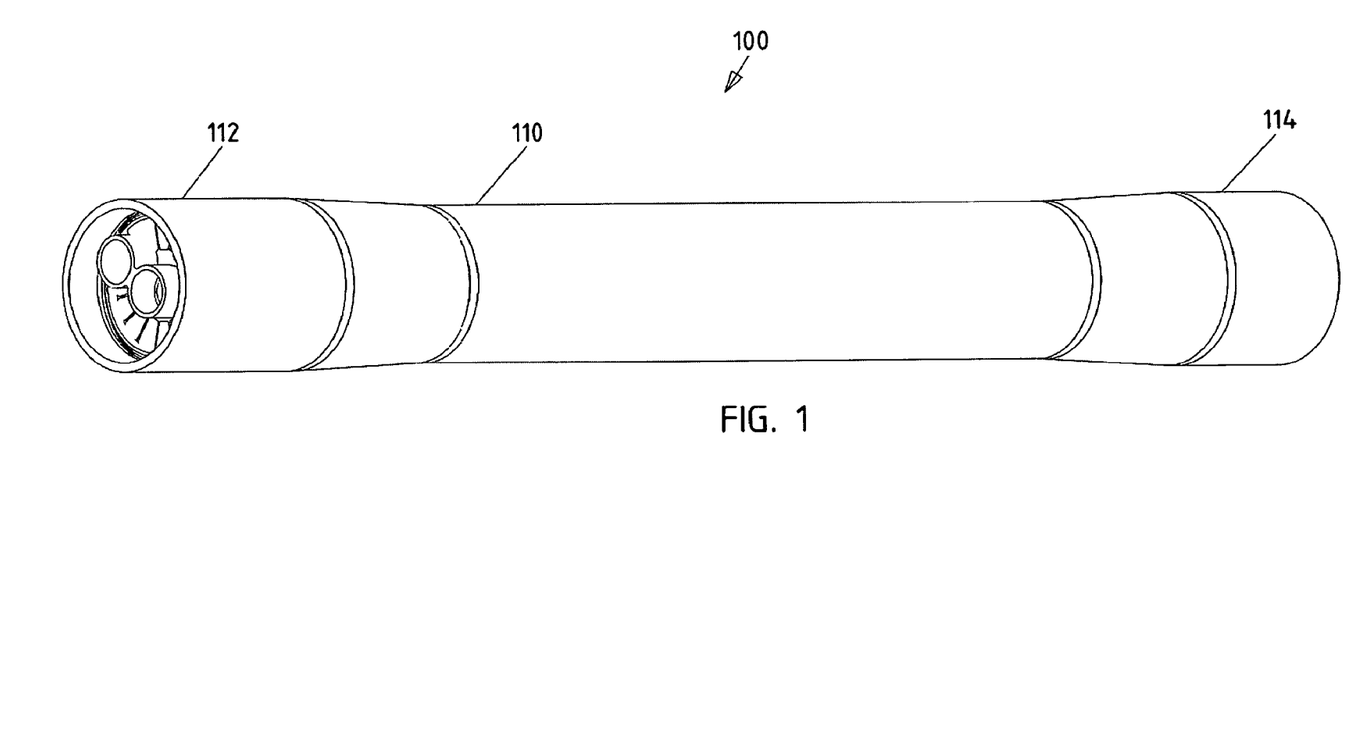
FIG. 1 illustrates a perspective view of a filtration system according to one or more embodiments.
Figure 2A:
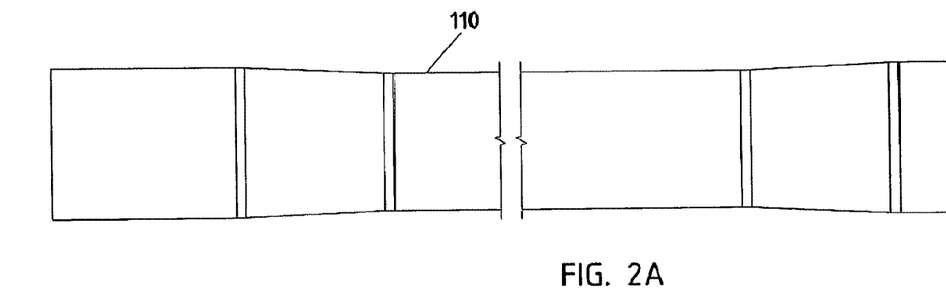
FIG. 2A illustrates a side view of a filtration system according to one or more embodiments.
Figures 2B, 2D:
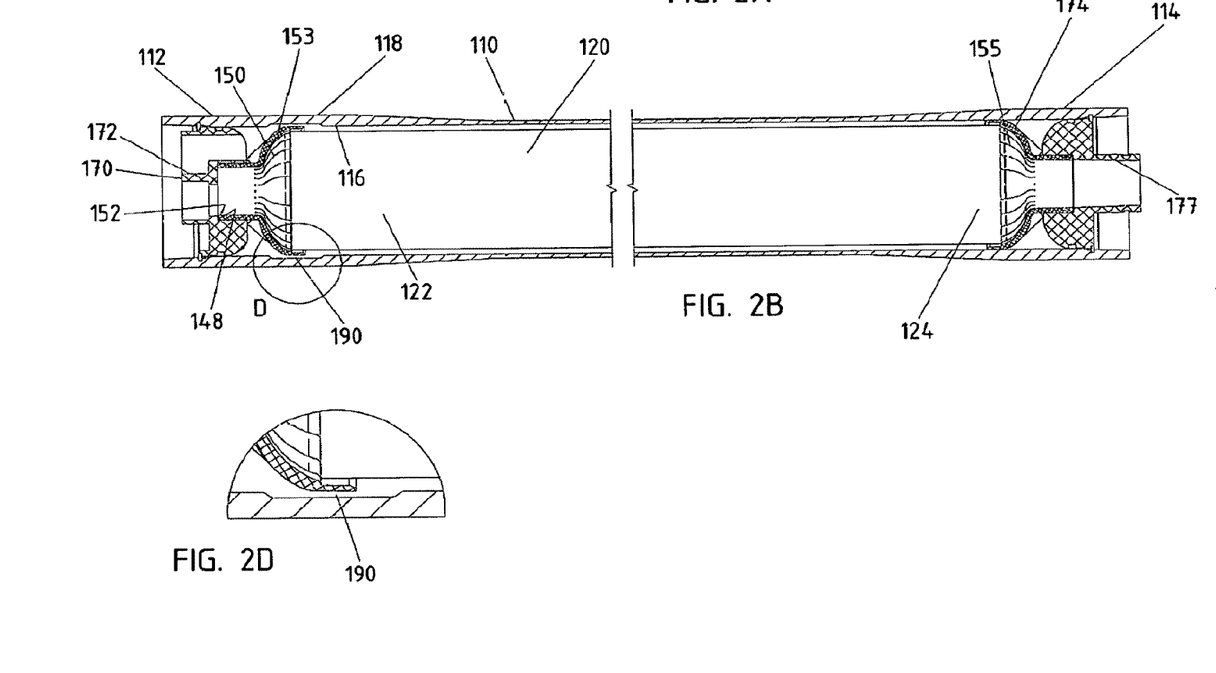
FIG. 2B illustrates a cross-sectional view of a filtration system according to one or more embodiments.
FIG. 2D illustrates an enlarged cross-sectional view of a portion of a filtration system according to one or more embodiments.
Figure 2C:
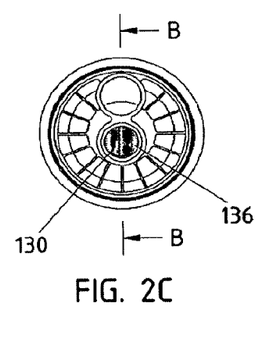
FIG. 2C illustrates an end view of a filtration system according to one or more embodiments.
Figure 3:
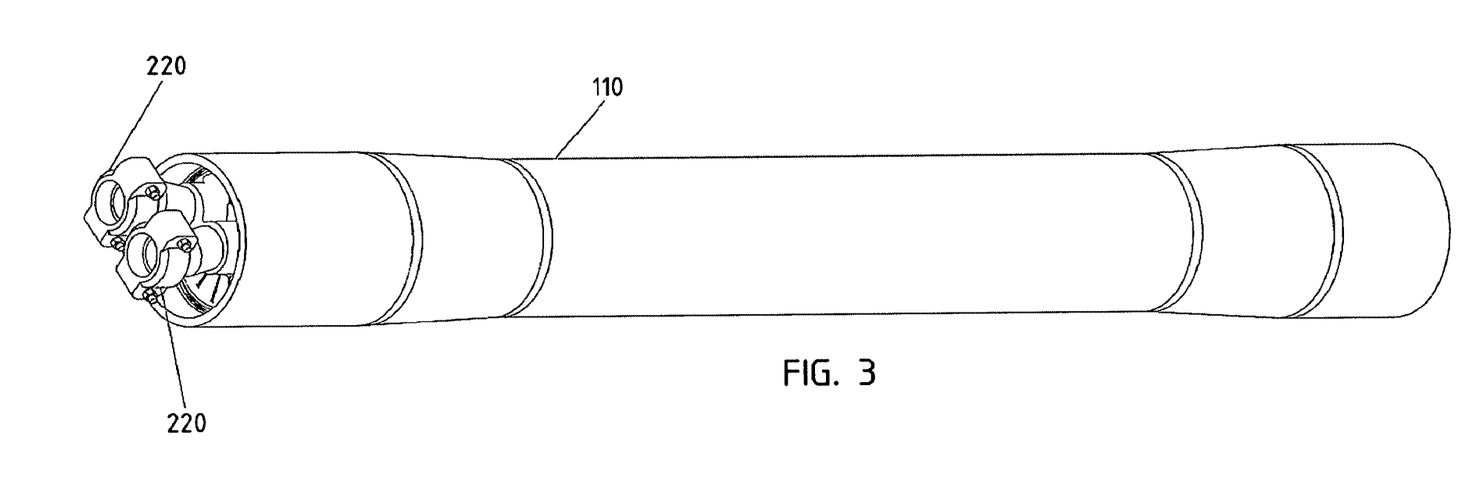
FIG. 3 illustrates a perspective view of a filtration system according to one or more embodiments.
Figure 4A:
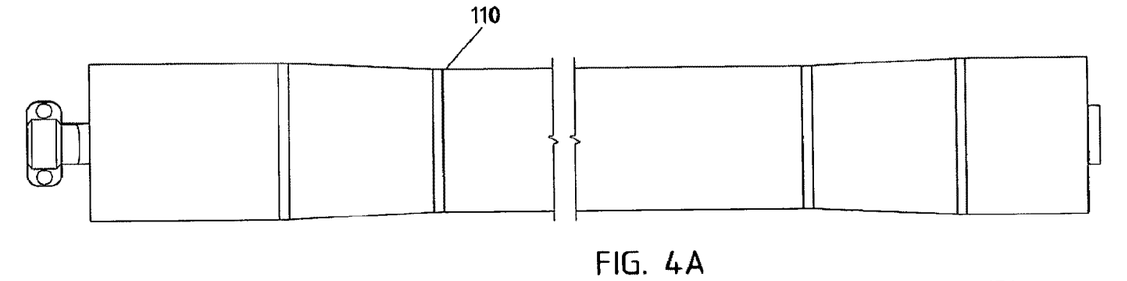
FIG. 4A illustrates a side view of a filtration system according to one or more embodiments.
Figure 4B:
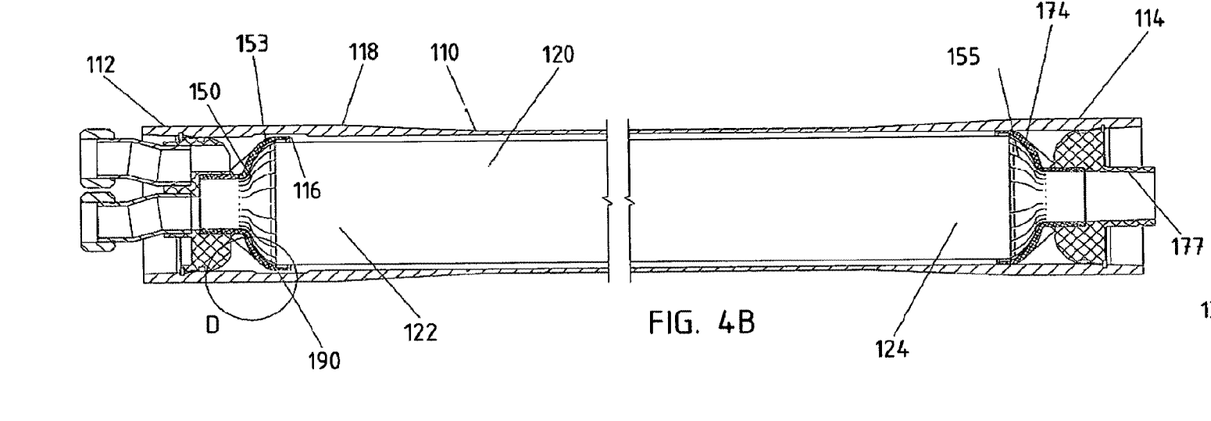
FIG. 4B illustrates a cross-sectional view of a filtration system according to one or more embodiments.
Figure 4C:
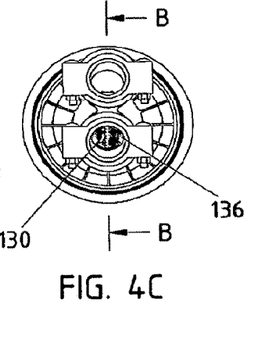
FIG. 4C illustrates an end view of a filtration system according to one or more embodiments.

The filtration assembly 100 further includes at least one inner end cap device 150, for example, disposed at the first membrane assembly end 122. In one or more embodiments, the membrane assembly 100 includes two inner end cap devices, including a first inner end cap device 153 and a second inner end cap device 155 disposed at the first membrane end 122 and the second membrane end 124, respectively. Referring to FIGS. 2B and 4B, the inner end cap device 150 is defined in part by a longitudinal axis and extends from a first end to a second end along the longitudinal axis. At the first end is a neck that serves as an inlet or outlet port 148 for the membrane assembly 120. The second end is sized to couple with the membranes. In one or more embodiments, the membrane 120 and the inner end cap device 150 form a water tight seal to the end of the membrane channels. In one or more embodiments, there is a water tight seal formed inside the end cap device at the second end, between the end cap device and the membrane 120.

In one or more embodiments, the first end of the inner end cap has an inner port 152. In one or more embodiments, the first end optionally has a smaller outer diameter than the second end. For example, in one or more embodiments the first end has an inner diameter, a first diameter, of about 3 inches and the second end has an inner diameter, a second diameter, of about 8 inches. In one or more embodiments, the first end has a diameter of 3-3.5 inches and the second end has a diameter of about 8 inches.

The filtration assembly further includes at least one outer end cap device 170, which is defined in part by a longitudinal axis, and extends from a first end to a second end. In one or more embodiments, the outer end cap device 170 is sealed with the housing 110. In one or more embodiments, the outer end cap device 170 is sealed with an inner diameter of the housing 110.

In one or more embodiments, the at least one outer end cap devices include the first outer end cap device 172, and a second outer end cap device 174. In one or more embodiments, the second outer end cap device 174 is coupled with the second inner end cap device 155. The second outer end cap device includes at least one port, such as a second dirty port 177, which can be used for the feed water or the concentrate. The second dirty port 177 is fluidly coupled with the second inner end cap device.

In one or more embodiments, a first outer end cap device 172 is disposed within the housing at the first housing end, and the first outer end cap device 172 is coupled with the first inner end cap device 153, for example at the first end of the end cap device.

Figure 6A:
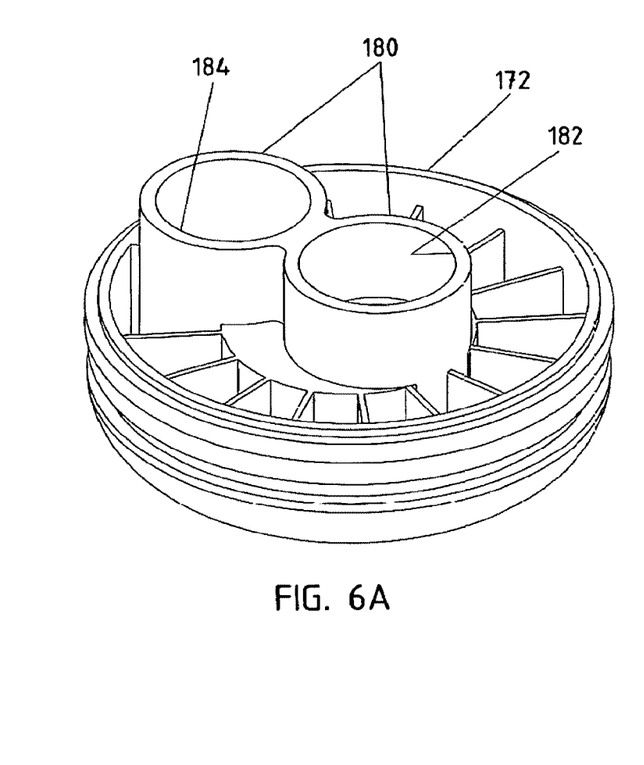
FIG. 6A illustrates a perspective view of an end cap device according to one or more embodiments.
Figure 6B:
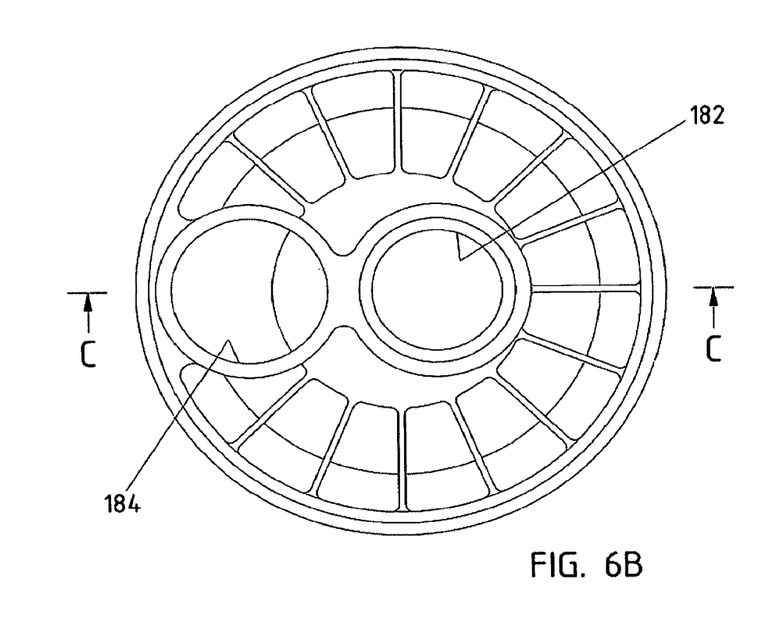
FIG. 6B illustrates a bottom view of a filtration system according to one or more embodiments.
Figure 6C:
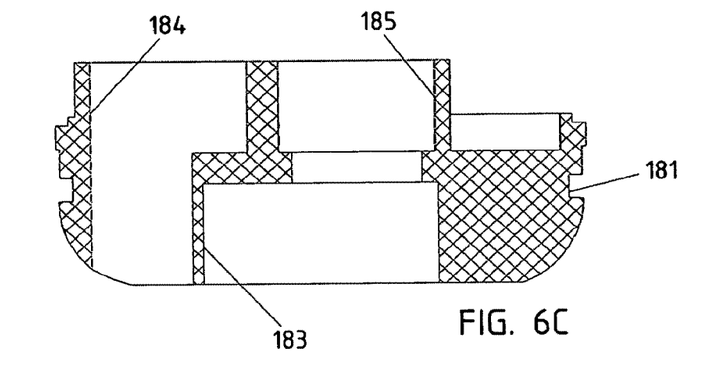
FIG. 6C illustrates a cross-sectional view of an end cap device according to one or more embodiments.

FIG. 6A, 6B, 6C illustrate the first outer end cap device 172 in greater detail. In one or more embodiments, the first outer end cap device 172 includes multi-ports 180 near the first end 176, where the multi-ports 180 include a first port and a second port. In one or more embodiments, the first outer end cap device 172 includes a first port that is a dirty water port 182, for example, feed water port, and a second port which is a clean water port 184, such as a permeate outlet port, for example. In one or more embodiments, the first outer end cap device 172 includes a second port that is a dirty water port 182, such as feed water inlet, and a first port which is a clean water port 184, such as a permeate outlet port. In one or more embodiments, the dirty water port 182 is fluidly separate from the clean water port 184. In one or more embodiments, the dirty water port 182 can be feed water ports and/or concentrate ports.

When the filtration assembly is assembled, the first port is fluidly separate from the second port, for example, the dirty water port 182 is fluidly separated or isolated from the clean water port 184. In one or more embodiments, the first port, the dirty water port or feed water inlet port is offset from a longitudinal axis of the inner port. In one or more embodiments, a cross section of the first and second ports, such as the feed water inlet port and the permeate outlet port, are substantially the same size. In one or more embodiments, the first port, such as a dirty water port 182 is fluidly coupled with the inner port 153 of the inner end cap device. In one or more embodiments, the dirty water port 182 has multiple different, stepped diameters, as shown in FIG. 6C. For example, an outer facing diameter 183 is larger than an inner facing diameter 185.

In one or more embodiments, clean water port 184, such as permeate outlet port has a non-symmetrical shape but provides a fluid coupling between an outer portion of the outer end cap device 172 to an inner portion of the outer end cap device 172, but maintaining a separate fluid coupling from the feed water inlet so that feed water will not co-mingle with the permeate. In one or more embodiments, the end cap device 172 seals with the housing 110. In one or more embodiments, the end cap device 172 seals with an inner diameter of the housing at 181. In one or more embodiments, the permeate outlet port 184 is coupled with a bypass 190.

Figure 4D:
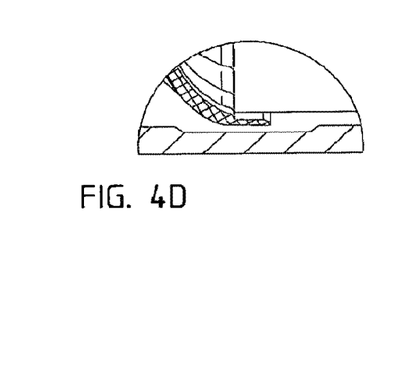
FIG. 4D illustrates an enlarged cross-sectional view of a portion of a filtration system according to one or more embodiments.

The bypass 190, as shown in FIGS. 2D and 4D, allows for a fluid path for the permeate which has traveled from the channels within the membrane assembly, to be removed from the filtration assembly via the bypass 190 around the first inner end cap device, and then through the permeate outlet port 184 of the outer end cap device. In one or more embodiments, a cross-sectional bypass area is substantially similar to a cross-sectional permeate outlet port area. In one or more embodiments, the housing inner diameter is recess to form the bypass 190 and forms a gap between the inner end cap and the housing, for example in the range of 3 mm-30 mm. In one or more embodiments, the internal diameter of the housing is enlarged to create a gap near the first inner end cap device and extends for a length similar to a length of the first inner end cap device. In one or more embodiments, the internal diameter of the housing is enlarged to create a gap near the first inner end cap device and extends for a length similar to a length greater than the first inner end cap device. In one or more embodiments, the internal diameter of the housing is enlarged to create a gap near the first inner end cap device and extends for a length similar to a length of the housing.

The end cap device provides a method of sealing/isolating the dirty water, such as the feed/concentrate, from clean water, such as the permeate. The device facilitates the ease of element assembly, and will facilitate the use of drop in elements in standard housing. In addition, the end cap device provides a place to hold a seal and provides a sealing surface. The material used for the end cap device can be chosen from a variety of materials, including, but not limited to PVC, CPVC, Ceramic, stainless steel, Duplex stainless steel, Hast alloy, Titanium, Filled thermoplastics, Thermoplastics, Composite materials, Aluminum, or coated metals, alone or in combination.

In one or more embodiments, a method of filtering water with a ceramic membrane filtration assembly as recited above includes supplying dirty water in the through the dirty water port of the first end cap device or a second dirty water port of the second end cap device, and releasing permeate though the clean water port of the first end cap device.

In one or more embodiments, the method further includes releasing contaminants through the dirty water port or the second dirty water port by supplying clean water to the clean water port to flow through the membrane assembly in a reverse direction.

Figure 5A:
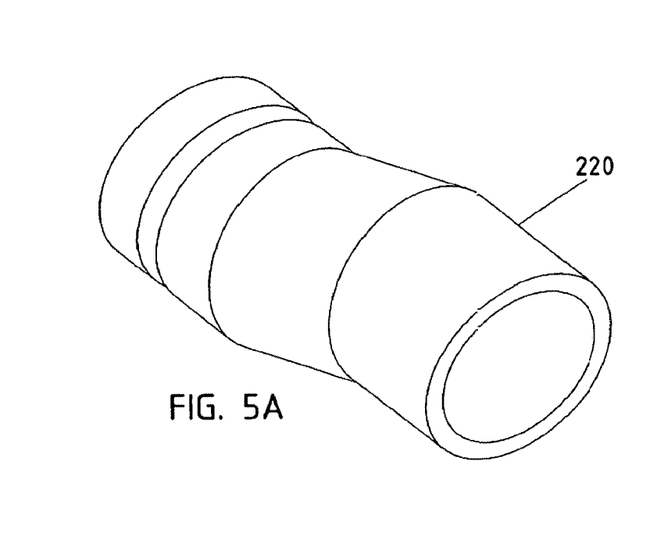
FIG. 5A illustrates a perspective view of an adaptor of the filtration system according to one or more embodiments.
Figure 5B:
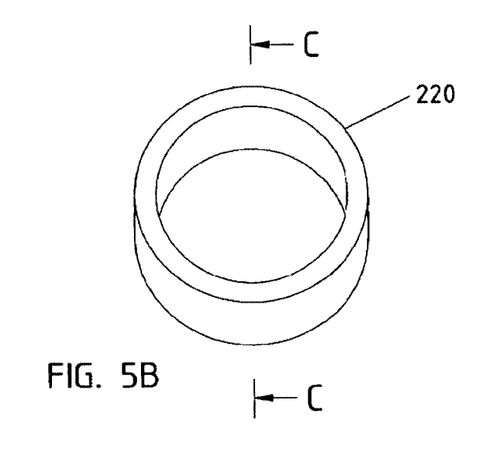
FIG. 5B illustrates an end view of an adaptor of the filtration system according to one or more embodiments.
Figure 5C:
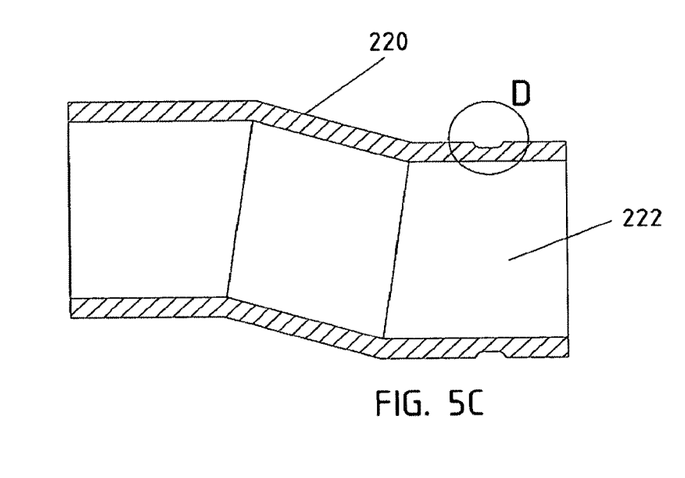
FIG. 5C illustrates a cross-sectional view of an adaptor of the filtration system according to one or more embodiments.
Figure 5D:
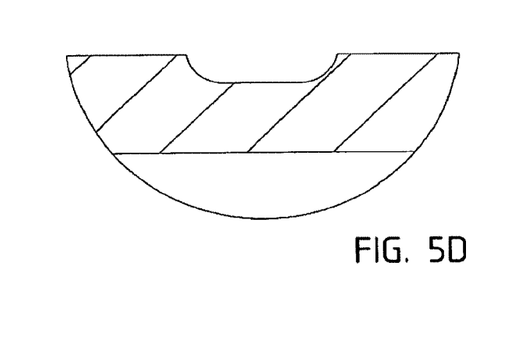
FIG. 5D illustrates an enlarged cross-sectional view of an adaptor of the portion of a filtration system according to one or more embodiments.

In one or more embodiments, the filtration assembly 100 further includes at least one coupler 220, as shown in FIGS. 3, 5A-5C. The coupler is an adaptor for the ports of the first outer end cap device, and allows for a clamp to be placed around the port. The Coupler 220 is defined in part by a longitudinal axis 222 which is non-linear, as shown in FIG. 5C. Other geometries could also be used.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. A ceramic membrane filtration assembly, comprising:
   a housing having a first housing end and second housing end, the housing having an outer circumference, the housing having an inner diameter;
   a membrane assembly disposed within the housing and extending from a first membrane assembly end to a second membrane assembly end, the membrane assembly comprising a ceramic membrane extending from a first membrane end to a second membrane end and having channels therein, each channel of the ceramic membrane comprising an interior and an exterior;
   a first inner end cap device disposed within the housing at the first housing end and coupled with the membrane assembly, the first inner end cap device comprising an inner port fluidly coupled with interiors of the channels of the ceramic membrane; and
   a first outer end cap device sealed within the housing at the first housing end, the first outer end cap device fluidly coupled with the first inner end cap device, the first outer end cap device comprising a feed water inlet connected to the inner port and a permeate outlet fluidly coupled to exteriors of the channels of the ceramic membrane through a bypass,
   wherein:
      the bypass is defined by a gap between the inner diameter of the housing and the first inner end cap device; and
      the ceramic membrane filtration assembly has a fluid path from the feed water inlet through the inner port to the interiors of the channels of the ceramic membrane, through the ceramic membrane to the exteriors of the channels of the ceramic membrane, and from the exteriors of the channels of the ceramic membrane past the bypass to the permeate outlet.

2. The ceramic membrane filtration assembly as recited in claim 1, wherein the first inner end cap device has a rounded, semi-spherical shape surrounding the inner port.

3. The ceramic membrane filtration assembly as recited in claim 1, wherein a longitudinal axis of the feed water inlet is offset from a longitudinal axis of the inner port.

4. The ceramic membrane filtration assembly as recited in claim 1, wherein a cross-section of the feed water inlet and a cross-section of the permeate outlet are substantially a same size.

5. The ceramic membrane filtration assembly as recited in claim 1, wherein a cross-sectional bypass area is substantially similar to a cross-sectional area of the permeate outlet.

6. The ceramic membrane filtration assembly as recited in claim 1, wherein the housing does not have a side port.

7. A ceramic membrane filtration assembly comprising:
a housing having a first housing end and second housing end, the housing having an outer circumference and an inner diameter;
a membrane assembly disposed within the housing and extending from a first membrane assembly end to a second membrane assembly end, the membrane assembly comprising a ceramic membrane extending from a first membrane end to a second membrane end and having channels therein, each channel of the ceramic membrane comprising an interior and an exterior;
a first inner end cap device disposed within the housing at the first housing end, the first inner end cap device coupled with the membrane assembly, the first inner end cap device comprising an inner port fluidly coupled with interiors of the channels of the ceramic membrane;
a first outer end cap device sealed within the housing at the first housing end, the first outer end cap device coupled with the first inner end cap device, the first outer end cap device comprising a feed water inlet connected to the inner port and a permeate outlet fluidly coupled to exteriors of the channels of the ceramic membrane through a bypass;
a second inner end cap device disposed within the housing at the second housing end, the second inner end cap device coupled with the membrane assembly; and
a second outer end cap device sealed within the housing at the second housing end, the second outer end cap device comprising a feed water port fluidly coupled with the second inner end cap device,
wherein:
the bypass is defined by a gap between the inner diameter of the housing and the first inner end cap device; and
the ceramic membrane filtration assembly has a fluid path from the feed water inlet through the inner port to the interiors of the channels of the ceramic membrane, through the ceramic membrane to the exteriors of the channels of the ceramic membrane, and from the exteriors of the channels of the ceramic membrane past the bypass to the permeate outlet.

8. The ceramic membrane filtration assembly as recited in claim 7, wherein each of the first and second inner end cap devices has a rounded, semi-spherical shape.

9. The ceramic membrane filtration assembly as recited in claim 7, wherein a longitudinal axis of the feed water inlet is offset from a longitudinal axis of the inner port.

10. The ceramic membrane filtration assembly as recited in claim 7, wherein the feed water inlet and the permeate outlet have a substantially same cross-sectional size.

11. The ceramic membrane filtration assembly as recited in claim 7, wherein a cross-sectional bypass area is substantially similar to a cross-sectional permeate outlet area.

12. The ceramic membrane filtration assembly as recited in claim 7, wherein the housing does not have a side port.

13. The ceramic membrane filtration assembly as recited in claim 1, wherein the ceramic membrane filtration assembly is configured so that, during use of the ceramic membrane filtration assembly, a liquid flows into the feed water inlet, from the feed water inlet to the inner port, from the inner port to the interiors of the channels of the ceramic membrane, from the interiors of the channels of the ceramic membrane through the ceramic membrane to the exteriors of the channels of the ceramic membrane, from the exteriors of the channels of the ceramic membrane to the bypass, and from the bypass to the permeate outlet.

14. The ceramic membrane filtration assembly as recited in claim 1, wherein the feed water inlet is fluidly connected with the permeate outlet via the channels of the ceramic membrane and the bypass.

15. The ceramic membrane filtration assembly as recited in claim 7, wherein the ceramic membrane filtration assembly is configured so that, during use of the ceramic membrane filtration assembly, a liquid flows into the feed water inlet, from the feed water inlet to the inner port, from the inner port to the interiors of the channels of the ceramic membrane, from the interiors of the channels of the ceramic membrane to the exteriors of the channels of the ceramic membrane, from the exteriors of the channels of the ceramic membrane to the bypass, and from the bypass to the permeate outlet.

16. The ceramic membrane filtration assembly as recited in claim 7, wherein the feed water inlet is fluidly connected with the permeate outlet via the channels of the ceramic membrane and the bypass.

\* \* \* \* \*